United States Patent [19]

Sadamori

[11] Patent Number: 5,311,172
[45] Date of Patent: May 10, 1994

[54] COMMUNICATION CONTROL SYSTEM

[75] Inventor: Yuuichi Sadamori, Hyogo, Japan

[73] Assignee: Mitsubishi Denki Kabushiki Kaisha, Tokyo, Japan

[21] Appl. No.: 629,027

[22] Filed: Dec. 18, 1990

Related U.S. Application Data

[63] Continuation of Ser. No. 234,930, Aug. 22, 1988, abandoned.

[30] Foreign Application Priority Data

Nov. 30, 1987 [JP] Japan ................... 62-300178

[51] Int. Cl.$^5$ .............................................. H04Q 1/00
[52] U.S. Cl. ........................... 340/825.5; 340/825.06; 370/85.4
[58] Field of Search ............... 340/825.50, 825.51, 340/825.05, 825.06; 370/58.3, 85.4, 85.2, 85.3, 85.6, 85.5

[56] References Cited

U.S. PATENT DOCUMENTS

| 4,409,592 | 10/1983 | 340 ........................ 825.5/ |
| 4,439,856 | 3/1984 | Ulug ...................... 370/85.3 |
| 4,560,985 | 12/1985 | Strecker et al. ........... 340/825.5 |
| 4,598,285 | 7/1986 | Hoshen .................... 340/825.51 |
| 4,751,701 | 6/1988 | Roos et al. ............... 340/825.5 |
| 4,799,052 | 1/1989 | Near et al. ............... 340/825.51 |
| 4,926,419 | 5/1990 | Whipple .................. 370/85.6 |

FOREIGN PATENT DOCUMENTS 2126848  3/1984  United Kingdom .

OTHER PUBLICATIONS

Ohm Sha, "Introduction to Data Communication System", Jan. 30, 1988, pp. 1/2–2/2.
Nippon Keiei Kyokai, "Entirety of LAN", Jun. 1, 1984.
I. Chlamtac et al., "An Optimal Hybrid Demand Access Protocol for Unrestricted Topology Broadcast Networks", Proceedings IEEE INFOCOM '86, Technical Sessions, Miami, Fla., Apr. 8–10, 1986, pp. 204–213, IEEE, N.Y., U.S.
L. P. West, "Carrier Sense Subset Multiple Access System", IBM Technical Disclosure Bulletin, vol. 22, No. 11, Apr. 1980, pp. 4811–4812, N.Y. U.S.

Primary Examiner—Donald J. Yusko
Assistant Examiner—Brian Zimmerman
Attorney, Agent, or Firm—Rothwell, Figg, Ernst & Kurz

[57] ABSTRACT

A communication system includes a plurality of communication stations communicating with each other over a communication channel, wherein each station is provided with a station number which is transmitted as part of a data signal. Transmission control circuitry in each station detects the presence of a carrier wave on the communication channel indicating that another station is transmitting data. The station number is read from the transmitted data and is used to determine the length of a waiting period during which no carrier wave is detected, and after which the station can transmit data. Data collision circuitry is provided which causes data retransmission in the event of a data collision on said channel, after a waiting period determined by the station number of the transmitting station.

3 Claims, 3 Drawing Sheets

COMMUNICATION CONTROL SYSTEM

This is a continuation of application Ser. No. 07/234,930, filed Aug. 22, 1988 now abandoned.

BACKGROUND OF THE INVENTION

1. Field of the Invention

This invention relates to a communication control system in a communication system which connects a plurality of communication stations on a communication channel.

2. Description of the Prior Art

FIG. 1 is a block diagram showing a conventional communication control system shown in, for example, the book entitled "A GUIDE TO DATA COMMUNICATION SYSTEM OF ILLUSTRATED COMPUTER SERIES" (Written by IWAO HOSAKA, published by OHM CO., Ltd. on Jan. 30, 1980), in which numeral 1 denotes a master communication station which supervises the communication system concerned, numerals 2 denote slave communication stations #1 through #n, and numeral 3 denotes a communication channel which connects the master communication station 1 with the slave communication stations 2 and connects the slave stations with one another.

Next, the operation of the communication system will be described. After the communication system has been started, the master communication station 1 has the leadership and executes communication control of the communication system concerned. In other words, after the master station 1 has started, it produces data addressed to the #1 slave communication station 2 and sends out the data onto the communication channel 3. The data are received at the #1 slave communication station 2 through the communication channel 3. After the completion of the reception of the data, the #1 slave communication station 2 concerned produces data addressed to the master communication station 1 and sends out the data onto the communication channel 3. The master communication station 1 receives the data. After the completion of the reception of the data, the master communication station 1 produces data addressed to the #2 slave communication station 2 and sends out the data onto the communication channel 3. Thereafter, the above-mentioned communication control is executed in order in the same way as above. The following communication such as the master communication 1 → the #1 slave communication station 2 → the master communication station 1 → the #2 slave communication 2 → the master communication station 1 → the #3 slave communication 2 → the master communication station 1 → . . . → the master communication station 1 → the #n slave communication station 2 → the master communication 1 → the #1 slave communication station 2 → is executed.

Since the conventional communication control system is constituted as described above, when any trouble happens in the master communication station 1 which supervises the communication system concerned, e.g. any electrical or mechanical difficulty preventing the station from effectively receiving and transmitting data, the influence extends to the whole of the communication system. That is, there is a problem that any trouble in only one communication station, e.g. the master communication station 17 makes the whole of the communication system break down.

SUMMARY OF THE INVENTION

This invention is devised in order to solve the above-mentioned problem, and its object is to obtain a communication control system in which any trouble in one communication station does not extend to the whole of the communication system.

In a communication control system according to this invention, each of communication stations in the system is provided with a carrier wave detecting unit for monitoring carrier waves on a communication channel, a transmission control unit for supplying a direction of transmission to the transmitting unit by means of timing control based on a carrier wave detection signal from the carrier wave detecting unit, a collision detecting unit for detecting a collision of transmission data, and an after-collision restoring unit for supplying a direction of retransmission to the transmitting unit by means of timing control based on a collision detection signal, and wherein each communication station serves as an equal station.

DETAILED DESCRIPTION OF THE PREFERRED EMBODIMENTS

Figure 1:
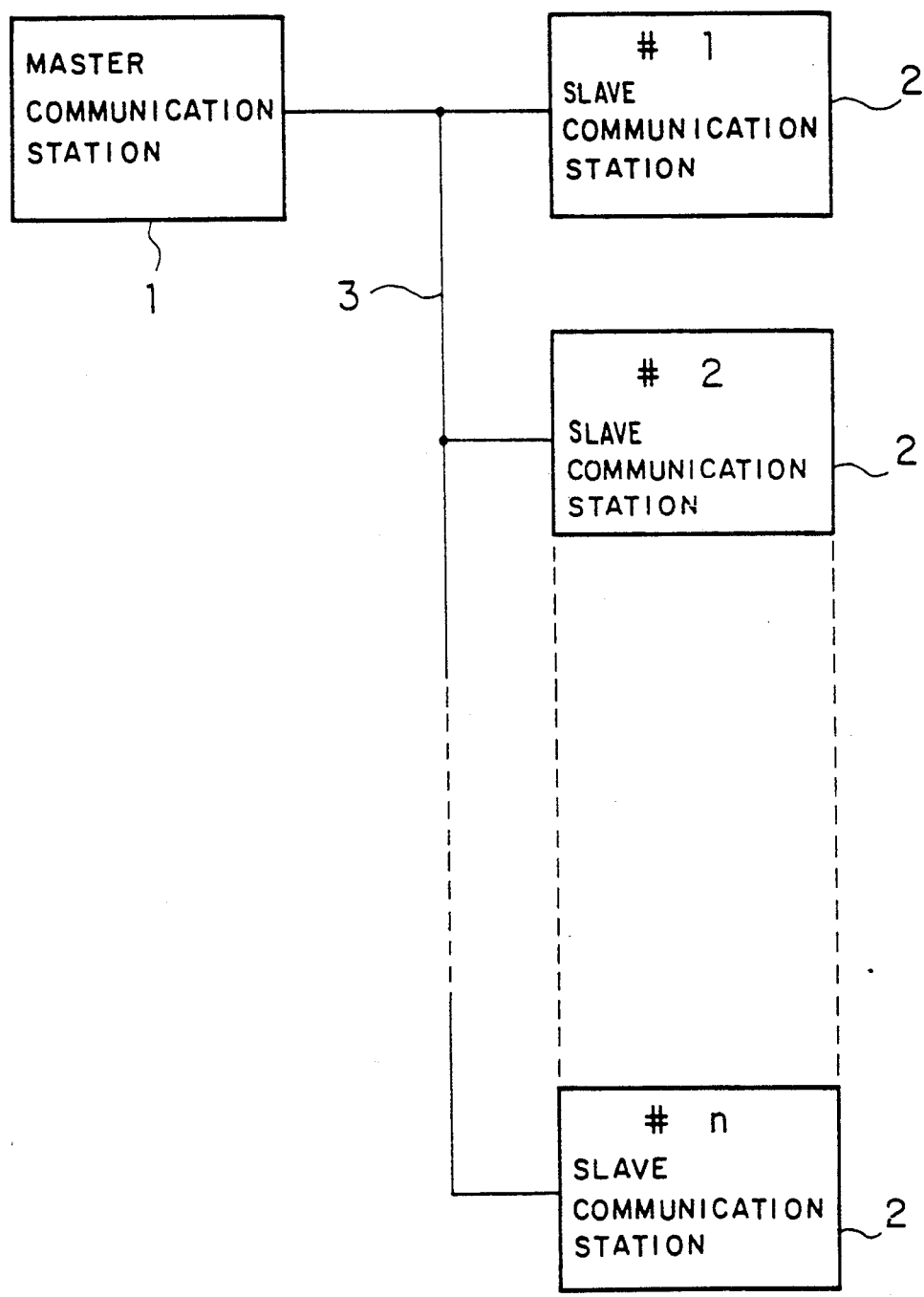
FIG. 1 is a block diagram showing a conventional communication control system.
Figure 2:
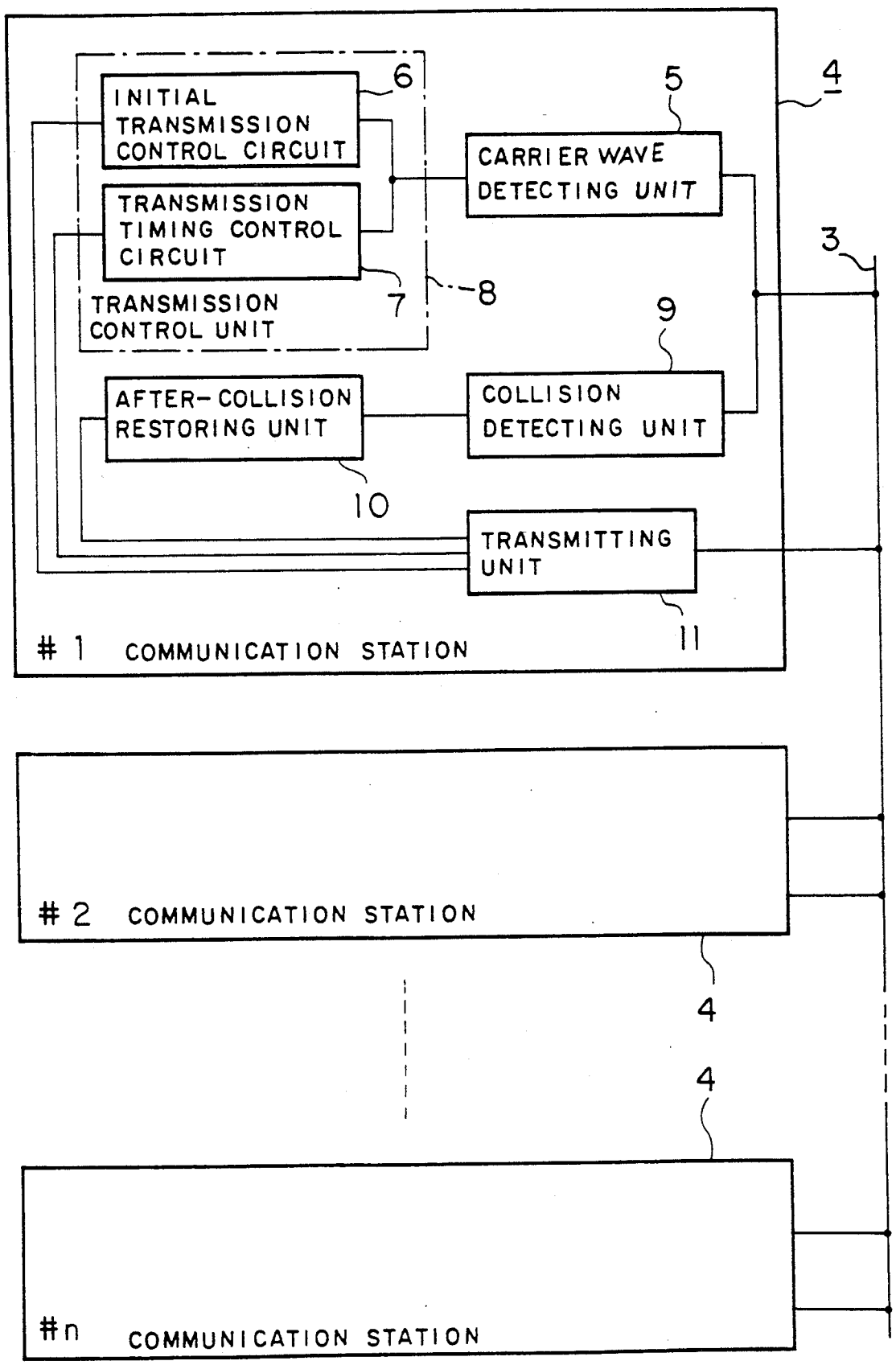
FIG. 2 is a block diagram showing a communication control system based on an embodiment according to this invention.

Hereinafter, an embodiment according to this invention will be described with reference to drawings. In FIG. 2, a numeral 3 denotes a communication channel and a numeral 4 denotes one of n communication stations composed of #1 through #n stations which are connected to the communication channel 3, and each of which is equal and does not have a master and slave relationship. A numeral 5 denotes a carrier wave detecting unit which is connected to the communication channel 3 for monitoring carrier waves and produces a carrier wave detection signal upon detection of the carrier waves on the communication channel 3, a numeral 6 denotes an initial transmission control circuit which is connected to the carrier wave detecting circuit 5 and produces a direction of transmission of data after starting by means of timing control based on the carrier wave detection signal, a numeral 7 denotes a transmission timing control circuit which is similarly connected to the carrier wave detecting unit 5 and produces a direction of transmission of data upon the expiration of a time period $T_N$ described later by means of timing control, based on the carrier wave detection signal. Reference numeral 8 denotes a transmission control unit comprising the initial transmission control circuit 6 and the transmission timing control circuit 7. Reference numeral 9 denotes a collision detecting unit which is connected to the communication channel 3, detects a collision of transmission, data, and produces a collision detection signal. Reference numeral 10 denotes an after-collision restoring unit which is connected to the collision detecting unit and produces a direction of retransmission of data bringing about the collision by means of timing control based on the collision detection signal. Reference numeral 11 denotes a transmitting unit which transmits data in accordance with directions of transmission from the initial transmission control circuit 6 and the transmission timing control circuit 7 or a direction of retransmission from the after-collision restoring unit 10. Each of the communication stations of #1 through #n 4 is composed of the above units.

The operation of the present invention will be described hereinafter. Each of the communication stations of #1 through #n 4 has the same control procedure. Each station monitors carrier waves on the communication channel 3 at its own carrier wave detecting unit 5 and produces the carrier wave detection signal upon detection of carrier waves. After a power source is turned on or each communication station 4 has been started by an initial reset and the like, the initial transmission control circuit 6 monitors arrival of the carrier wave detection signal from the carrier wave detecting unit 5 during the time interval T defined by the following expression (1) $T_1$ denotes an initial time interval for detecting a carrier wave during which no data is transmitted by the station. If the initial transmission control circuit 6 is not provided with the arrival of the carrier wave detection signal within the time interval concerned $T_1$, it sends out a direction of transmission of data to the transmitting unit 11.

$$T_1 > \text{(transmitting time of \#1 station)} + \text{(transmitting time of \#2 station)} + \text{- - -(transmitting time of \#n station)} + T_s \times n \quad (1)$$

Figure 3:
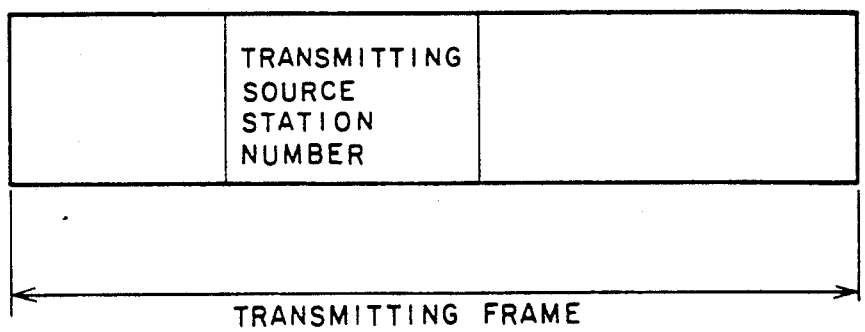
FIG. 3 is a diagram illustrating one example of a transmitting block which is transmitted on a communication channel.

Here, the transmitting time of #1 station, #2 station etc. represents the time it takes each station to transmit data. However, if the initial transmission control circuit 6 is provided with arrival of the carrier wave detection signal within the time interval $T_1$, it reads the transmitting source station number in the transmitting frame which is being communicated. If the station number from which the signal is transmitted is equal to the station number lower by "1" than that of the receiving communication station (the maximum station number in the system if the station number of the communication station is the minimum station number in the system), the initial transmission control circuit 6 sends out a direction of transmission of data to the transmitting unit 11 when the time interval $T_s$ elapses after the carrier wave has disappeared. Here, $T_s$ is a time interval which elapses starting after the carrier wave has disappeared and until the transmission of data is enabled according to the transmitting frame shown in FIG. 3 and illustrated in FIG. 4 number represents the total number of the communication stations 4 connected to the communication channel 3. The transmitting unit which received a direction of transmission of the data allots the station number of the communication station to the transmission source station number in the transmitting frame and then starts the transmission onto the communication channel 3. Incidentally, since the station numbers except the transmission source station number are not related to this invention particularly, the illustration is omitted.

Next, when a transmitting wave of a communication station to be primarily transmitted is not transmitted, each communication station backs up the communication system mutually through following procedures. In other words, the transmission timing control circuit 7 monitors the carrier wave detection signal from the carrier wave detecting unit 5. If the transmission timing control circuit 7 is not provided with a new carrier wave detection signal within the time interval $T_N$ defined by the following expressions (2) and (3) after the carrier wave has disappeared, it sends out a direction of transmission of data to the transmitting unit 11.

$$T_N = (M-N) \times T_2 \quad (M>N) \quad (2)$$

$$T_N = (n+M-N) \times T_2 \quad (M<N) \quad (3)$$

Figure 4:
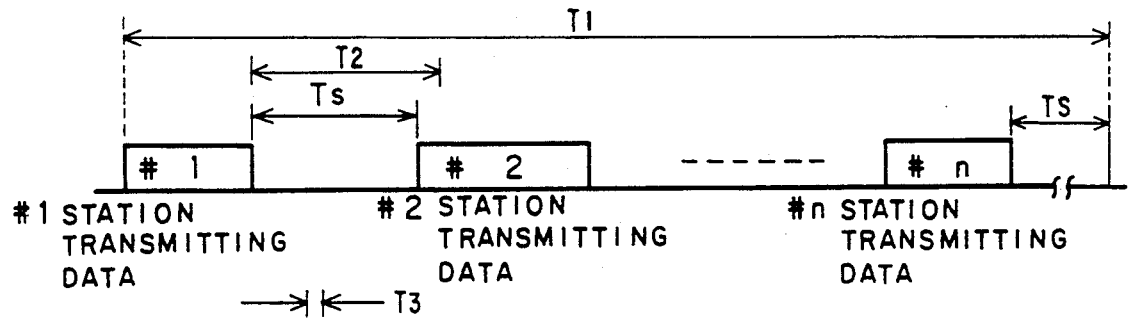
FIG. 4 is a diagram illustrating the state of communication based on a communication control system according to this invention.

Here, a numeral M denotes the station number of the communication station, a numeral n denotes, the maximum station number in the system, a numeral N denotes the station number allotted to the transmission source station number in the transmitting frame of the newest carrier wave. $T_N$ thus denotes the time period that must expire, during which no carrier wave is detected, before transmitting unit 11 can begin to transmit data. $T_2$ denotes a time interval which satisfies the inequality $T_2 > T_s$. The transmitting unit 11 which has received the direction of transmission allots the station number of the communication station to be primarily transmitted to the transmission source station number in the transmitting frame and starts communication to the communication channel 3, thereby conducting communication while each communication station 4 equally performs mutual back up. The communication is conducted while the above-mentioned communication control is executed in order as follows: the #1 communication station, the #2 communication station, the #3 communication station . . . #n communication station, #1 communication station, #2 communication station, . . . FIG. 4 illustrates the order in which the communication is conducted.

In this way, since each communication station 4 connected to the communication channel 3 controls its start of transmission of data based on the time allotted thereto, the transmitting frames sent out from each communication station 4 do not usually collide with each other on the communication channel 3. However, in starting or in the case where a collision of a transmitting frame occurs due to some causes such as troubles, e.g. simultaneous transmission from different stations, the collision of the transmitting frame concerned is detected by the collision detecting unit 9. Here, there are available various kinds of methods for detecting collisions. For example, there is a method in which a sent out transmitting frame is received in the communication station and the conformity between the transmitting frame and the received transmitting frame is detected. When nonconformity between the transmitting frame and the received transmitting frame is detected, a collision has occurred. When the collision detecting unit 9 detects a collision of a transmitting frame on the communication channel 3, it sends out the collision detection signal to the after-collision restoring unit 10. The after-collision restoring unit 10 which has received the collision detection signal sends out a direction of retransmission to the transmitting unit 11 after the time interval $T_m$ given by the expression (4) has elapsed.

$$T_m = T_3 \times M \quad (4)$$

Here, the numeral M is the station number of the communication station, and $T_3$ is such a constant time interval as to satisfy the inequality $T_3 << T_s$. The transmitting unit 11 which has received the direction of transmission allots the station of its communication station to the transmission source station number in the above-mentioned transmitting frame and starts the retransmission of data bringing about the collision onto the communication channel 3 for restoring the communication.

Incidentally, though the above-mentioned embodiment which used the communication channel 3 connected by wires was shown, it may be realized by using radio waves. Also, the configuration of connection may be of a bus-type, a star-type, etc., that is, of any configuration of connection. In any case, they have the same effect as the above-mentioned embodiment.

As described above, according to this invention, each of the communication stations is constructed in such a manner that it monitors carrier waves on the communication channel and controls transmission of data by means of timing control based on a detection signal for carrier waves, and when the collision of transmission data is detected, the retransmission of the data is controlled by timing control based on the collision detection signal. Each of the communication stations is equal respectively, and since the communication is conducted while backing up each other, an improved communication system results in which troubles in one communication station do not extend to the whole of the communication system.

What is claimed is:

1. A communication system, comprising:
    a communication channel; and
    a plurality of communication stations, said communication stations communicating with each other over said communication channel, each communication station in said system being identified by a station number and including
        a transmitting unit for transmitting a data signal including a transmitting station source number identifying the station from which said data signal has been transmitted,
        carrier wave detection means for detecting the presence of a carrier wave on said communication channel indicative of the transmission of a data signal by another communication station and outputting a carrier wave detection signal in response thereto, and
        a transmission control unit including means for instructing said transmitting unit to transmit data upon expiration of an initial time period consisting of a predetermined period of time during which no carrier wave has been detected beginning after initialization of the station in which the transmission control unit is provided, means responsive to said carrier wave detection signal for reading a station source number from said data signal transmitted by another communication station as indicated by said carrier wave detection signal and determining a waiting period which varies as a function of the read station source number, and means for instructing said transmitting unit to transmit data upon expiration of said determined waiting period during which no carrier wave has been detected, the expiration of said determined waiting period being determined by said transmission control unit, wherein said initial time period is an amount of time sufficient to allow all stations in the system to complete transmission of data, n represents the number of communication stations in said system, and $T_1$ represents said initial time period, such that $T_1 >$ (transmitting time of #1 station) + (transmitting time of #2 station) + (transmitting time of #3 station) + ... (transmitting time of #n station) + $(T_s \times n)$ wherein $T_s$ is a predetermined time interval required between transmissions of different stations, and the transmitting time of each station is a known amount of time required for completion of data transmission, and wherein said waiting period is an amount of time sufficient to allow all stations having a station number between said read station source number and the station number of the reading station to complete transmission of data, and $T_N$ represents said waiting period, such that $T_N = (M-N) \times T_2, M > N$ $T_N = (n+M-N) \times T_2, M < N$ wherein $T_2$ is a time interval such that $T_2 > T_s$, N is the value of the station source number read by said transmission control unit, and M is the value of the station source number of the reading station in which said transmission control unit is contained.

2. A communication system according to claim 1, wherein each communication system further comprises:
    collision detecting means for detecting a collision of transmitted data and outputting a signal in response thereto; and
    after-collision restoring means responsive to said collision detecting output signal for instructing said transmitting unit to retransmit said data after a waiting period determined according to the value of the station source number of the reading station in which said restoring means is contained.

3. A communication system according to claim 2, wherein $T_m$ represents the waiting period determined by said after-collision restoring means, such that $T_m = T_3 \times M$ wherein $T_3$ is a time interval such that $T_3 << T_s$.

* * * * *

UNITED STATES PATENT AND TRADEMARK OFFICE
CERTIFICATE OF CORRECTION

PATENT NO. : 5,311,172
DATED : May 10, 1994
INVENTOR(S) : Yuuichi Sadamori

It is certified that error appears in the above-indentified patent and that said Letters Patent is hereby corrected as shown below:

<u>On the title page:</u> Under "References Cited -- U.S. PATENT DOCUMENTS" subheading, the inventor(s) of the '592 patent should be listed as -- Hunt -- instead of "340";
Col. 1, line 22, "numerals" should be -- numeral --; Col. 1, line 67, "17" should be -- 1, --; Col. 2, line 59, delete the comma; Col. 2, line 65, after "transmission" delete the comma; Col. 3, line 9, "4" should be deleted; Col. 3, line 12, "4" should be deleted; Col. 3, line 22, after "(1)" insert a period; Col. 3, line 52, after "4" insert -- .A --; Col. 3, line 52, after "number" (first occurrence) insert -- n --; Col. 4, line 14, after "denotes" delete the comma; Col. 4, line 34, before "FIG. 4" insert a period.

Signed and Sealed this

Fourth Day of October, 1994

*Attest:*

BRUCE LEHMAN

*Attesting Officer*    *Commissioner of Patents and Trademarks*